(12) United States Patent
Yamada et al.

(10) Patent No.: US 8,040,376 B2
(45) Date of Patent: Oct. 18, 2011

(54) VEHICLE MONITOR APPARATUS

(75) Inventors: Ayako Yamada, Fujieda (JP); Hidenori Sato, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 1219 days.

(21) Appl. No.: 11/735,555

(22) Filed: Apr. 16, 2007

(65) Prior Publication Data

US 2007/0273764 A1    Nov. 29, 2007

(30) Foreign Application Priority Data

May 23, 2006    (JP) ................................ 2006-143243

(51) Int. Cl.
*H04N 7/18* (2006.01)
(52) U.S. Cl. ........ 348/148; 348/143; 348/151; 348/161; 348/142
(58) Field of Classification Search ............... 250/208.1; 348/139–159
See application file for complete search history.

(56) References Cited

U.S. PATENT DOCUMENTS

| 7,655,894 | B2 * | 2/2010 | Schofield et al. | .......... 250/208.1 |
| 2004/0032493 | A1 * | 2/2004 | Franke et al. | .................. 348/148 |
| 2009/0040306 | A1 * | 2/2009 | Foote et al. | .................... 348/148 |

FOREIGN PATENT DOCUMENTS

| DE | 100 37 978 A1 | 3/2001 |
| DE | 10 2005 000 650 A1 | 7/2006 |
| JP | 7-304388 | 11/1995 |
| JP | 11-142181 | 5/1999 |
| JP | 2001-97116 | 4/2001 |
| JP | 2001-119687 | 4/2001 |
| JP | 2003-182454 | 7/2003 |
| JP | 2005-193838 | 7/2005 |
| JP | 2005-280526 | 10/2005 |

* cited by examiner

*Primary Examiner* — Douglas Blair
*Assistant Examiner* — Michael Martinez
(74) *Attorney, Agent, or Firm* — Oblon, Spivak, McClelland, Maier & Neustadt, L.L.P.

(57) ABSTRACT

To provide a vehicle monitor apparatus capable of acquiring more information through effective utilization of an image taking region of a camera on the occasion of taking interior and exterior images of a vehicle with the camera.

A vehicle monitor apparatus 1 is provided with a drive recorder 11 and a reflecting mirror 12. The drive recorder 11 is provided with a camera 14 and the camera 14 is arranged to take a forward image of the vehicle 2. In an image taking region of the camera 14, the reflecting mirror 12 is located in a range where a hood 23 should be imaged if the reflecting mirror 12 were excluded, and the camera 14 takes an image of an exterior situation outside the vehicle viewed through a windshield 22, and an image projected by the reflecting mirror 12.

4 Claims, 4 Drawing Sheets

(a)

(b)

US 8,040,376 B2

VEHICLE MONITOR APPARATUS

BACKGROUND OF THE INVENTION

1. Field of the Invention

The present invention relates to vehicle monitor apparatus and, more particularly, to a vehicle monitor apparatus provided with a camera in a vehicle interior and adapted to monitor the interior and exterior of a vehicle with the use of images taken with this camera.

2. Related Background Art

In recent years, there are the known vehicle interior monitor apparatus for monitoring the vehicle interior, in order to permit a taxi driver to check a passenger and ensure the security thereof, or in order to monitor acts of a child in the vehicle. For example, the vehicle interior monitor apparatus disclosed in Japanese Patent Application Laid-Open No. 2001-119687 (Patent Document 1) is equipped with a video camera arranged as directed backward, on a support of an inner mirror of the vehicle. The apparatus is arranged to monitor the vehicle interior, while displaying an image taken with this video camera, on a monitor display provided in a region where a driver can visually recognize the image.

There are also the known monitor apparatus with a drive recorder, for example, for prevention of an accident of the vehicle, for investigation of the cause in the event of occurrence of an accident, and so on. For example, the safety drive recorder disclosed in Japanese Patent Application Laid-Open No. 11-142181 (Patent Document 2) is arranged to record and save images taken with a plurality of small cameras.

Furthermore, the automobile monitor system disclosed in Japanese Patent Application Laid-Open No. 2003-182454 (Patent Document 3) is also known as an apparatus capable of taking images of plural regions around the vehicle with a camera. In this monitor system, the camera is disposed in the vehicle interior and this camera is arranged to take a forward image of the vehicle and also take a backward image of the vehicle reflected by a mirror. In this manner, the monitor system is able to take both the forward and backward images of the vehicle with only one camera.

[Patent Document 1] Japanese Patent Application Laid-Open No. 2001-119687

[Patent Document 2] Japanese Patent Application Laid-Open No. 11-142181

[Patent Document 3] Japanese Patent Application Laid-Open No. 2003-182454

Incidentally, either of the vehicle interior monitor apparatus disclosed in the foregoing Patent Document 1 and the drive recorder disclosed in the foregoing Patent Document 2 is arranged to take the image with the camera or the images with the cameras. For this reason, the apparatus can be provided with the camera that can be used for both of the monitor of the vehicle interior and the drive recorder. In this case, the camera needs to take the forward and backward images of the vehicle, and the use of the mirror as in the monitor system disclosed in the forgoing Patent Document 3 enables the single camera to take the forward and backward images of the vehicle.

However, when the camera is provided in the vehicle interior to monitor the outside of the vehicle, the camera must be located at a position where it does not block the driver's view. Positions not to block the driver's view are limited, and are, for example, somewhere on a ceiling of the vehicle interior, above the inner mirror, or inside the inner mirror. When the camera was mounted at such a location to take the exterior image outside the vehicle, there was the problem that the hood of the vehicle or the like was taken in the image to fail effective utilization of the image taking region and decrease the volume of information relative to the imagable region.

An object of the present invention is therefore to provide a vehicle monitor apparatus capable of acquiring more information through effective utilization of an image taking region of a camera on the occasion of taking interior and exterior images of a vehicle with the single camera.

SUMMARY OF THE INVENTION

A vehicle monitor apparatus according to the present invention, which solved the above problem, is a vehicle monitor apparatus comprising: a camera disposed in a vehicle interior of a vehicle and adapted to take an exterior image outside the vehicle interior; and other region projecting member located in an image taking region of the camera and adapted to project an image of an other region except for a region subjected to direct image taking with the camera; wherein there are the following regions formed in the image taking region of the camera: an image taking region which is a region where the image projected by the other region projecting member is taken; and a direct image taking region which is the region subjected to the direct image taking with the camera, except for the image taking region; and wherein an extended region of the image taking region blocked by the other region projecting member includes a part of the vehicle.

In the vehicle monitor apparatus according to the present invention, the extended region of the image taking region blocked by the other region projecting member would be a waste region where a part of the vehicle is imaged, if the other region projecting member were absent, but in the present invention, the other region projecting member is present in this extended region to permit the camera to take the image of the other region in the vehicle. For this reason, the vehicle monitor apparatus is able to acquire more information through effective utilization of the image taking region of the camera on the occasion of taking the exterior image of the vehicle with the single camera.

The vehicle monitor apparatus can be arranged in a form wherein the other region projecting member is a mirror and wherein the other region is the vehicle interior projected by reflection of the mirror. When the other region projecting member is the mirror as in this form, the camera is able to take an image of a situation in the vehicle interior by making use of reflection of the mirror.

The vehicle monitor apparatus can also be arranged in a form wherein the camera takes a forward image of the vehicle and wherein the part of the vehicle is a hood of the vehicle.

The camera is located at a position where the hood of the vehicle is likely to be imaged, on the occasion of taking the forward image of the vehicle. Since the waste region to image the hood is utilized as the image taking region, the image taking region of the camera can be utilized more effectively.

Furthermore, the vehicle monitor apparatus can also be arranged in a form wherein the camera is housed in an inner mirror provided in the vehicle interior. When the camera is disposed inside the inner mirror, the camera can be installed in an unexposed state in the vehicle interior, and this form prevents trouble of the camera and improves the design quality.

EFFECT OF THE INVENTION

The vehicle monitor apparatus according to the present invention is able to acquire more information through effective utilization of the image taking region of the camera on the occasion of taking the interior and exterior images of the vehicle with the single camera.

DESCRIPTION OF THE PREFERRED EMBODIMENTS

Figure 1:
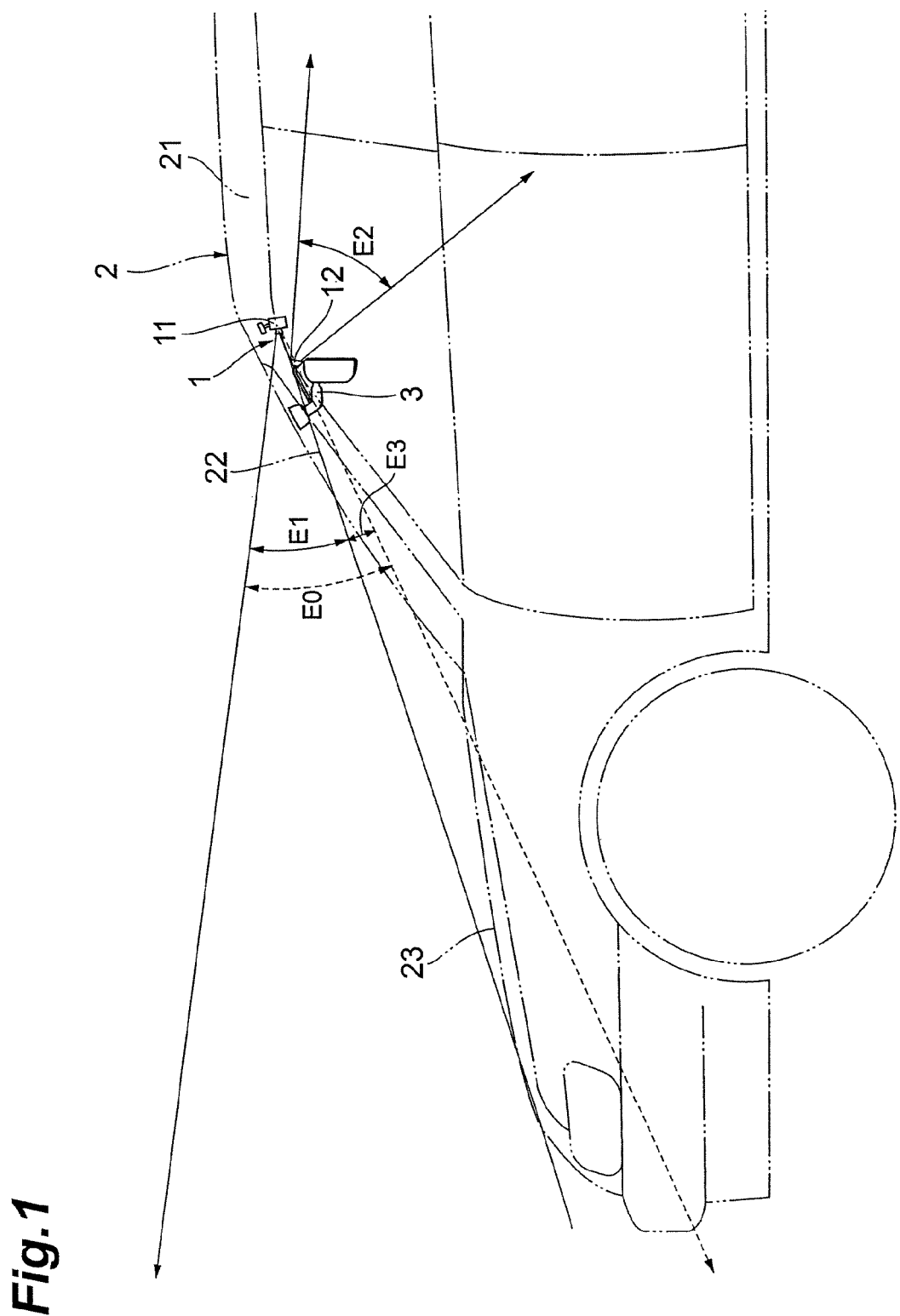
FIG. 1 is a schematic sectional side view of a vehicle with a vehicle monitor apparatus according to the first embodiment.

Embodiments of the present invention will be described below with reference to the drawings. FIG. 1 is a schematic sectional side view of a vehicle with a vehicle monitor apparatus according to the first embodiment of the present invention, and FIG. 2 is a schematic sectional side view of the vehicle monitor apparatus.

Figure 2:
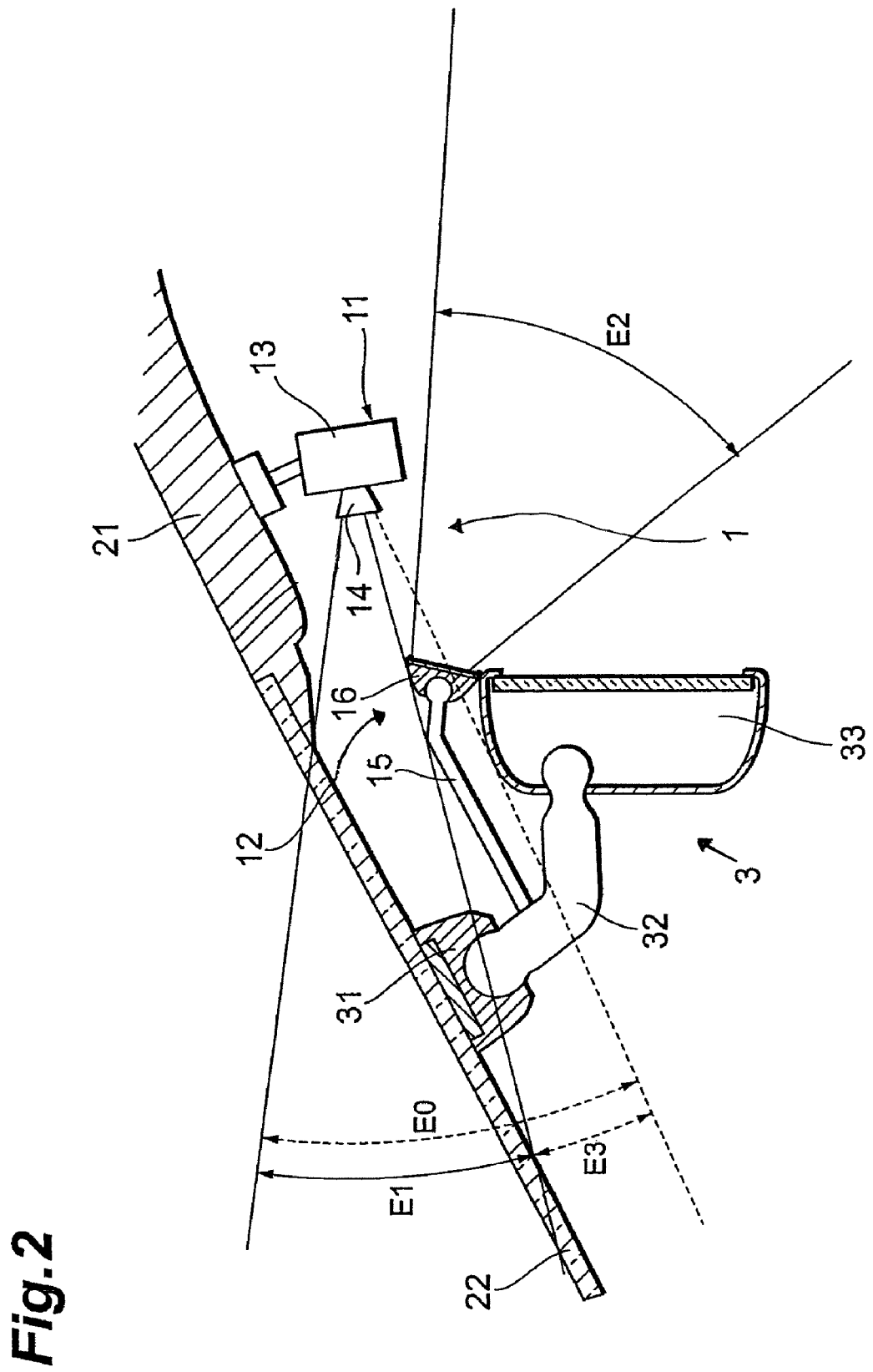
FIG. 2 is a schematic sectional side view of the vehicle monitor apparatus.

As shown in FIGS. 1 and 2, the vehicle monitor apparatus 1 of the present embodiment is provided in the vehicle 2. The vehicle 2 is provided with a ceiling portion 21 and a windshield 22, and a hood 23 is located in front thereof (in the driving direction of vehicle 2). An inner mirror 3 is attached to the windshield 22. The inner mirror 3 has a base 31 fixed to the windshield 22. A stay 32 is attached to the base 31, and an inner mirror body 33 is attached to the stay 32. In this manner, the inner mirror body 33 is attached through the base 31 and stay 32 to the windshield 22.

The vehicle monitor apparatus 1 is equipped with a drive recorder 11 and a reflecting mirror 12. The drive recorder 11 has a recorder body 13 and a camera 14, and the reflecting mirror 12 has a shaft 15 and a reflecting mirror body 16.

The drive recorder 11, as shown in FIG. 2, is disposed on the ceiling portion 21 in the vehicle interior of the vehicle 2. The recorder body 13 in the drive recorder 11 is equipped with a storage device such as a memory for storing an image taken with the camera 14. The camera 14 is installed as directed forward of the vehicle 2, and is arranged mainly to take an image of a situation outside the vehicle viewed through the windshield 22, and an image projected by the reflecting mirror 12.

The shaft 15 in the reflecting mirror 12 is of a shape obtained by bending a part of a rodlike member. The stay 32 in the inner mirror 3 is connected to one end of the shaft 15, and the reflecting mirror body 16 to the other end. In this manner, the reflecting mirror body 16 is attached through the shaft 15 to the stay 32 of the inner mirror 3. The reflecting mirror body 16 is arranged so that the mirror surface is directed backward of the vehicle and reflects an interior image of the vehicle interior toward the position where the camera 14 is located. In the present embodiment a plane mirror is used as the reflecting mirror body 16 in the reflecting mirror 12, but a convex mirror can also be used as the reflecting mirror body. When the convex mirror is used as the reflecting mirror body, the image taking region becomes wider.

The camera 14 is arranged to take an exterior image outside the vehicle, and the hood 23 being a part of the vehicle 2 is included in an extended region of the image taking region where the camera 14 takes the image of the reflecting mirror 12, in the image taking region of the camera 14. The reflecting mirror 12 reflects and projects the interior image of the vehicle interior. Specifically, as shown in FIGS. 1 and 2, the image taking region of the camera 14 would be a range E0 without provision of the reflecting mirror 12, but with provision of the reflecting mirror 12, the image taking region by the camera 14 is a range E1 subjected to direct image taking with the camera 14, and a range E2 subjected to reflection by the reflecting mirror 12. The region to image the range E1 subjected to the direct image taking is the direct image taking region of the present invention, and the region to image the range E2 subjected to the reflection by the reflecting mirror 12 is the image taking region of the present invention. The image of the vehicle interior projected by the reflecting mirror 12 is shown in the range E2 subjected to the reflection by the reflecting mirror 12. A range E3 resulting from exclusion of the range E1 from the range E0 is an extended region of the range where the reflecting mirror 12 blocks the view of the camera 14, and the hood 23 being a part of the vehicle 2 is located in this range E3.

The action of the vehicle monitor apparatus of the present embodiment having the above-described configuration will be described below.

In the vehicle monitor apparatus 1 of the present embodiment, the camera 14 takes the forward image of the vehicle 2 and the interior image of the vehicle interior during running of the vehicle 2, and the taken images are recorded in the recorder body 13. This record is erased a predetermined time, e.g., a few hours later, and new images are successively recorded.

The images taken with the camera 14 include the image directly taken with the camera 14, and the image reflected by the reflecting mirror 12. Since the camera 14 is arranged as directed forward of the vehicle 2, the camera 14 directly takes the image of the forward region of the vehicle 2 through the windshield 22. The camera 14 also photographs the reflecting mirror 12 to take the image of the vehicle interior reflected by the reflecting mirror 12. When the reflecting mirror 12 is provided in this manner, the single camera 14 is able to simultaneously take the images of the interior and exterior of the vehicle.

Figure 3:
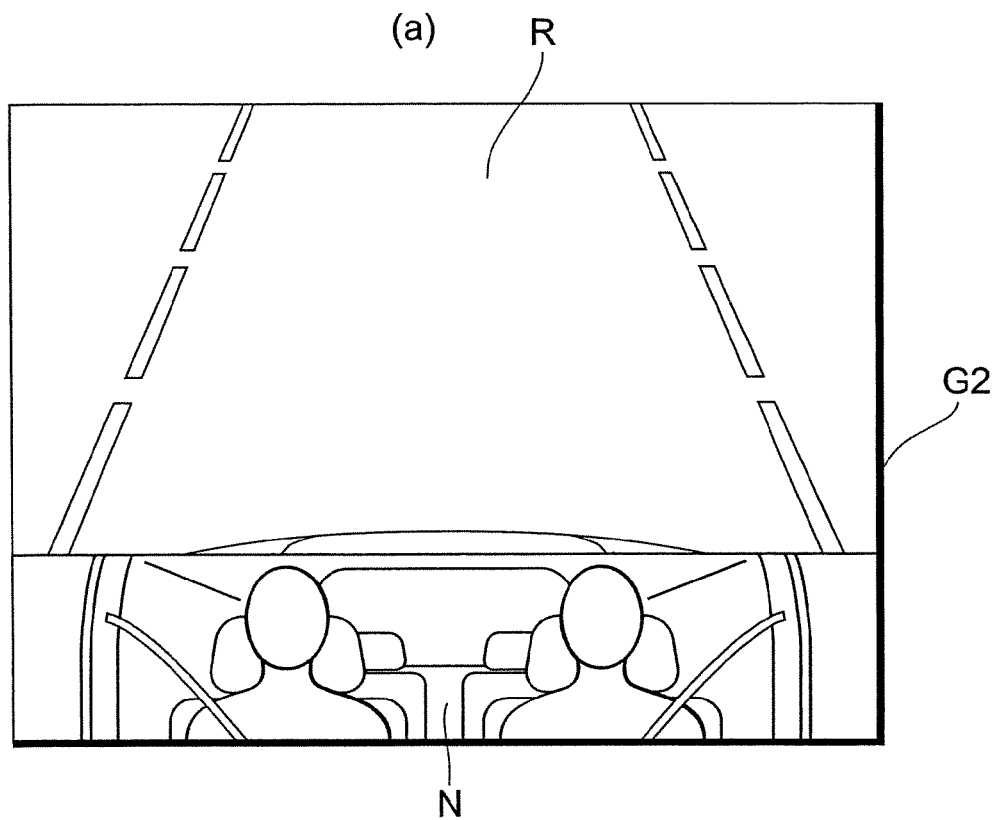
FIG. 3 includes (a) a view showing an example of an image with a camera in the vehicle monitor apparatus of the first embodiment, and (b) a view showing an example of an image with a camera in a conventional vehicle monitor apparatus.
Figure 3:
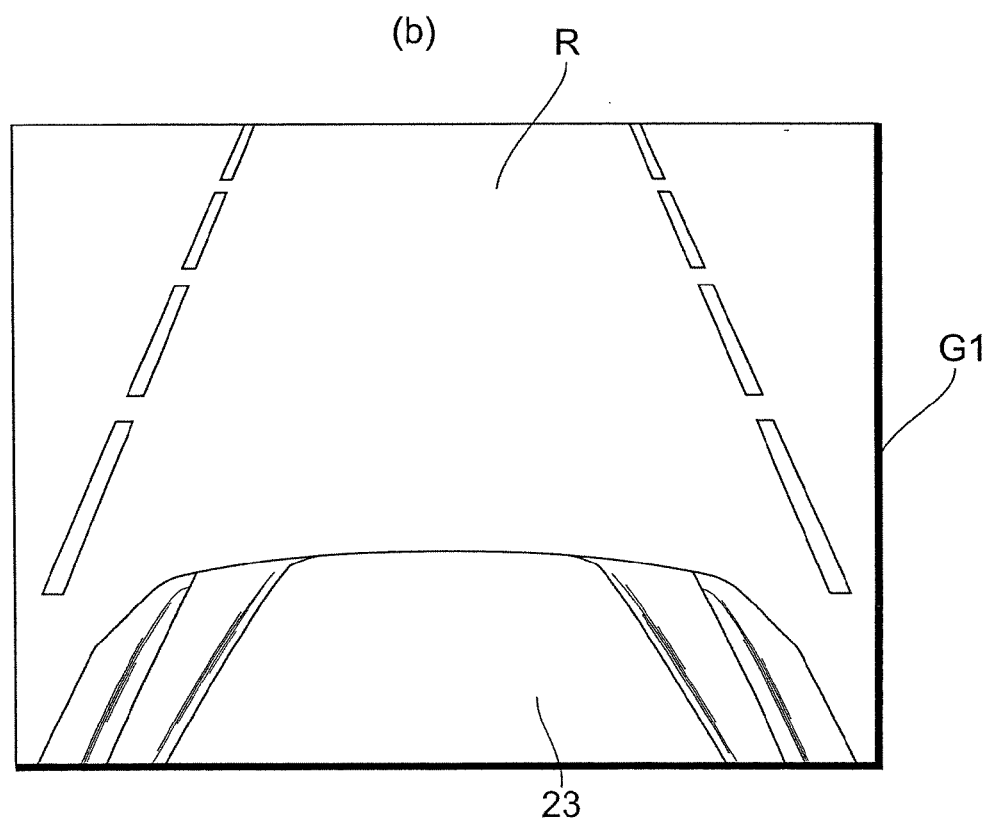

The reflecting mirror 12 is located at the position where the camera 14 would take the image of the hood 23 of the vehicle 2, without provision of the reflecting mirror 12. If the reflecting mirror 12 were excluded, an image G1 taken with the camera 14 would be one including an image of the hood 23 as well as an image of a road R in front of the vehicle, for example, as shown in FIG. 3(b). Since the hood 23 taken herein is rarely used in execution of image analysis or the like by the drive recorder 11, the taken image of the hood 23 has a low value. Therefore, the taken region of the hood 23 is a dead space in a sense.

In contrast to it, the vehicle monitor apparatus 1 of the present embodiment is able to show a situation of the vehicle interior N at the location where the hood 23 should be photographed, as in an image G2 shown in FIG. 3(a). For this reason, the dead space can be effectively utilized. Therefore, the vehicle monitor apparatus is able to acquire more information through the effective utilization of the image taking region of the camera on the occasion of taking the interior and exterior images of the vehicle with the single camera.

Figure 4:
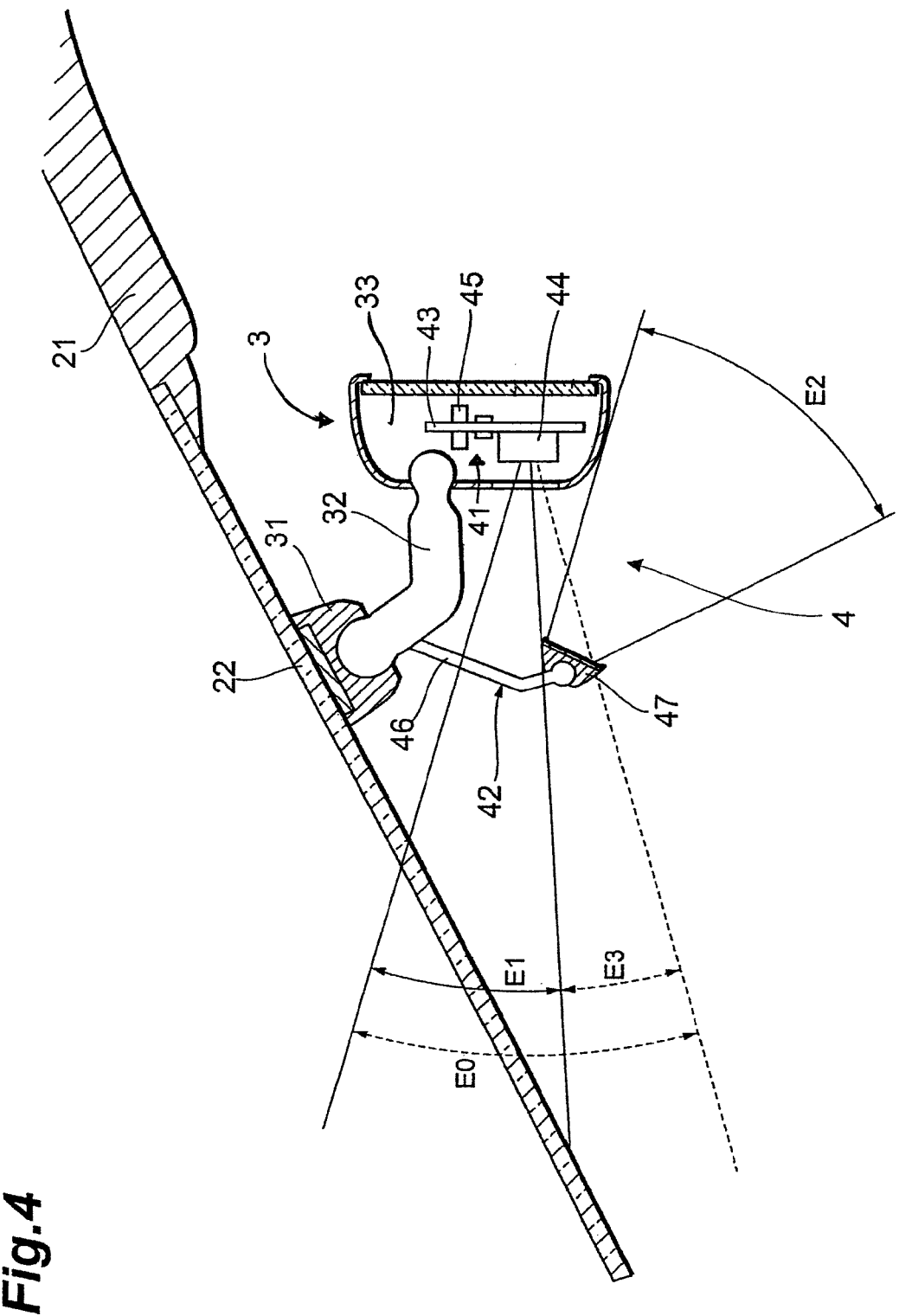
FIG. 4 is a schematic sectional side view of a vehicle monitor apparatus according to the second embodiment.

The below will describe the second embodiment of the present invention. FIG. 4 is a schematic sectional side view of a vehicle monitor apparatus according to the second embodiment.

As shown in FIG. 4, the vehicle monitor apparatus 4 of the present embodiment is a vehicle monitor apparatus built in the inner mirror, and is provided with a drive recorder 41 and a reflecting mirror 42, and the drive recorder 41 is housed in a case of the inner mirror body 33 in the inner mirror 3. The drive recorder 41 is provided with a control substrate 43 forming the recorder body, and a camera 44, and a memory 45 is attached to the control substrate 43. The reflecting mirror 42 is provided with a shaft 46 and a reflecting mirror body 47. The shaft 46 is of a shape obtained by bending a part of a rodlike member. The stay 32 in the inner mirror 3 is connected to one end of the shaft 46, and the reflecting mirror body 47 to the other end. The other configuration is much the same as in the first embodiment described above.

The vehicle monitor apparatus 4 of the present embodiment having the above-described configuration is able to show the image of the situation inside the vehicle interior at the position where the hood 23 should be photographed, as is the case in the first embodiment. For this reason, the dead space can be effectively utilized. Therefore, the vehicle monitor apparatus is able to acquire more information through the effective utilization of the image taking region of the camera on the occasion of taking the interior and exterior images of the vehicle with the single camera. Since in the vehicle monitor apparatus 4 of the present embodiment the drive recorder 41 is housed in the inner mirror 3, the camera 44 can be set in an unexposed state in the vehicle interior. Therefore, this configuration is able to prevent trouble of the camera 44 and to improve the design quality.

The above described the preferred embodiments of the present invention, but it is noted that the present invention is by no means limited to the above embodiments. For example, the above embodiments used the reflecting mirror as the other region projecting member, but the other region projecting member can also be a monitor or the like for displaying an image taken with another camera. The other camera herein can be, for example, a camera disposed in an outer rearview mirror of the vehicle and arranged to photograph a region near the front wheel of the vehicle, or a camera disposed in the rear part or in the side part of the vehicle and arranged to photograph a region near the body of the vehicle in order to prevent contact with an obstacle such as a wall, on the occasion of backing the vehicle into a garage or the like. The other region in this case is a region photographed with another camera.

The above embodiments were so arranged that the camera 14 or 44 photographed the forward view of the vehicle, but it is also possible to adopt a form in which the camera photographs the backward view of the vehicle. Furthermore, the above embodiments showed the examples wherein a part of the vehicle was the hood, but it is also possible to adopt other forms wherein a part of the vehicle is such a portion as a rear trunk, a nose, or a frame.

What is claimed is:

1. A vehicle monitor apparatus comprising:
    a camera disposed in a vehicle interior of a vehicle and which takes an exterior image outside the vehicle interior; and
    other region projecting member located in an image taking region of the camera and which projects an image of an other region which excludes a region subjected to direct image taking with the camera;
    wherein the image taking region of the camera comprising:
        an image taking region which is a region where the image projected by the other region projecting member is taken, and
        a direct image taking region which is the region subjected to the direct image taking with the camera, except for the image taking region; and
    wherein an extended region of the image taking region blocked by the other region projecting member includes a part of the vehicle.

2. The vehicle monitor apparatus according to claim 1,
    wherein the other region projecting member is a mirror, and
    wherein the other region is the vehicle interior projected by reflection of the mirror.

3. The vehicle monitor apparatus according to claim 1,
    wherein the camera takes a forward image of the vehicle, and
    wherein the part of the vehicle is a hood of the vehicle.

4. The vehicle monitor apparatus according to claim 1,
    wherein the camera is housed in an inner mirror provided in the vehicle interior.

* * * * *